(12) United States Patent
Eum et al.

(10) Patent No.: US 9,979,303 B2
(45) Date of Patent: May 22, 2018

(54) PRIMARY SIDE REGULATION POWER SUPPLY DEVICE

(71) Applicant: FAIRCHILD KOREA SEMICONDUCTOR LTD., Bucheon-si (KR)

(72) Inventors: Hyun-Chul Eum, Seoul (KR); In-Ki Park, Seoul (KR); Eung-Woo Lee, Seoul (KR)

(73) Assignee: Semiconductor Components Industries, LLC, Phoenix, AZ (US)

( * ) Notice: Subject to any disclaimer, the term of this patent is extended or adjusted under 35 U.S.C. 154(b) by 22 days.

(21) Appl. No.: 14/598,451

(22) Filed: Jan. 16, 2015

(65) Prior Publication Data

US 2015/0207418 A1 Jul. 23, 2015

Related U.S. Application Data

(60) Provisional application No. 61/928,531, filed on Jan. 17, 2014.

(30) Foreign Application Priority Data

Dec. 29, 2014 (KR) .................. 10-2014-0192632

(51) Int. Cl.
*H02M 3/335* (2006.01)
*H02M 1/32* (2007.01)
(52) U.S. Cl.
CPC ......... *H02M 3/33523* (2013.01); *H02M 1/32* (2013.01)

(58) Field of Classification Search
CPC . H02M 3/33507; H02M 3/33523; H02M 1/32
See application file for complete search history.

(56) References Cited

U.S. PATENT DOCUMENTS

| | | | | |
|---|---|---|---|---|
| 4,233,950 A | * | 11/1980 | Krolski | .................... F02P 11/04 123/146.5 B |
| 2008/0123377 A1 | * | 5/2008 | Lin | .................... H02M 3/33569 363/78 |
| 2008/0278973 A1 | * | 11/2008 | Lin | .................... H02M 3/33523 363/21.08 |
| 2011/0227506 A1 | * | 9/2011 | Ren | .................... H02M 3/33507 315/307 |
| 2013/0181635 A1 | * | 7/2013 | Ling | ................ H02M 3/33507 315/297 |
| 2013/0342125 A1 | * | 12/2013 | Eom | .................. H05B 33/0878 315/223 |
| 2013/0343090 A1 | * | 12/2013 | Eom | ................ H02M 3/33507 363/16 |
| 2014/0185336 A1 | * | 7/2014 | Sugahara | .......... H02M 3/33523 363/21.16 |

* cited by examiner

*Primary Examiner* — Jue Zhang
(74) *Attorney, Agent, or Firm* — AMPACC Law Group, PLLC

(57) ABSTRACT

A primary-side regulation (PSR) power supply device according to the invention includes: a power switch; an auxiliary wiring from which an auxiliary voltage that depends on an output voltage is generated during a turn-off period of the power switch and being provided in a primary side; a clamping circuit clamping a voltage corresponding to the auxiliary voltage to a predetermined voltage; a voltage follower decreasing the sense voltage according to a decrease of the auxiliary voltage; and a switch control circuit controlling a switching operation of the power switch by using the sense voltage.

16 Claims, 6 Drawing Sheets

PRIMARY SIDE REGULATION POWER SUPPLY DEVICE

CROSS-REFERENCE TO RELATED APPLICATION

This application claims priority to and the benefit of U.S. Patent Application No. 61/928,531 filed in the USPTO on Jan. 17, 2014, and Korean Patent Application No. 10-2014-0192632, filed with the Korean Intellectual Property Office on Dec. 29, 2014, the entire contents of which are incorporated herein by reference.

BACKGROUND (a) Technical Field

Exemplary embodiments of the invention relates to a power supply device. In particular, the exemplary embodiment relates, for example, to a power supply device to which primary-side regulation (PSR) is applied.

(b) Description of the Related Art

A range of an output voltage of a power supply device may vary according to a load. For example, when the power supply device supplies power to a load where a plurality of LEDs are connected in series, an output voltage range is changed according to the number of LEDs.

A control IC of a PSR power supply device receives a sense voltage that is proportional to an output voltage. In this case, a sense voltage range is set in the control IC. For example, a sense voltage range of 0.8 V to 3 V is set in the control IC, the minimum level of the sense voltage is controlled to be 0.8 V, and the maximum level of the sense voltage is controlled to be 3 V. When the maximum level of the sense voltage exceeds 3 V, an over-voltage protection operation is activated.

However, when the output voltage is changed according to a load, a problem may occur if the sense voltage is controlled by the voltage range set in the control IC. For example, when the number of LEDs connected in series to the PSR power supply is increased and thus the output voltage is increased, the sense voltage is also increased and thus the over-voltage protection operation may be activated even in a normal condition.

The sense voltage range is widened as the output voltage range is widened, and a conventional PSR power supply device cannot sufficiently cover the sense voltage range. Thus, when the output voltage is changed, a design of the control IC also needs to be changed.

The above information disclosed in this Background section is only for enhancement of understanding of the background of the invention and therefore it may contain information that does not form the prior art that is already known in this country to a person of ordinary skill in the art.

SUMMARY OF THE INVENTION

The invention has been made in an effort to provide a PSR power supply device that can be normally operated even though a range of an output voltage is wide.

A primary-side regulation (PSR) power supply device according to an exemplary embodiment of the invention includes: a power switch; an auxiliary wiring from which an auxiliary voltage that depends on an output voltage is generated during a turn-off period of the power switch and being provided in a primary side; a clamping circuit clamping a voltage corresponding to the auxiliary voltage to a predetermined voltage; a voltage follower decreasing the sense voltage according to a decrease of the auxiliary voltage; and a switch control circuit controlling a switching operation of the power switch by using the sense voltage.

The PSR power supply device further includes a first resistor and a second resistor coupled in series, wherein a voltage of a first node where a first end of the first resistor and a first end of the second resistor are coupled is the sense voltage, and the auxiliary voltage is limited to a clamping voltage by the clamping circuit and the clamping voltage is supplied to a second end of the second resistor.

The clamping circuit includes: a third resistor including a first end coupled to the auxiliary voltage and a second end coupled to the second end of the second resistor; a first diode including an anode coupled to the second end of the third resistor; and a first Zener diode coupled to a cathode of the first diode, and the clamping voltage is a voltage corresponding to a Zener voltage of the first Zener diode.

The voltage follower may further include a capacitor coupled between a second node to which the first Zener diode and the cathode of the first diode are coupled and the auxiliary voltage.

The PSR power supply device may further include a first resistor and a second resistor coupled in series, wherein a voltage of the first node where a first end of the first resistor and a first end of the second resistor are coupled is the sense voltage, and the voltage follower decreases a voltage of a second end of the second resistor according to a decrease of the auxiliary voltage.

The voltage follower may include a capacitor electrically coupled between the auxiliary voltage and the second end of the second resistor. Alternatively, the voltage follower may include a capacitor coupled in parallel with the third resistor.

The PSR power supply device further includes an over-voltage sensing circuit that increases the sense voltage according to an increase of the auxiliary voltage when the auxiliary voltage is higher than a predetermined threshold voltage.

The PSR power supply device further includes first to third resistors coupled in series, wherein a voltage of a first node to which a first end of the first resistor and a first end of the second resistor are coupled is the sense voltage and a second end of the second resistor and a first end of the third resistor are coupled in a third node, and, when the auxiliary voltage is higher than the threshold voltage, the over-voltage sensing circuit increases a voltage of the third node according to the increase of the auxiliary voltage.

The over-voltage sensing circuit includes: a second diode including an anode coupled to the auxiliary voltage; and a second Zener diode including a cathode coupled to a cathode of the diode and an anode coupled to the third node.

A voltage of a second end of the third resistor may be limited to a clamping voltage by the clamping circuit.

The clamping circuit includes: a fourth resistor including a first end coupled to the auxiliary voltage and a second end coupled to the second end of the third resistor; a first diode including an anode coupled to the second end of the fourth resistor; and a first Zener diode coupled to a cathode of the first diode, and the clamping voltage is a voltage corresponding to a Zener voltage of the first Zener diode.

The voltage follower may include a capacitor electrically coupled between the auxiliary voltage and the second end of the fourth resistor. Alternatively, the voltage follower may include a capacitor coupled to the first Zener diode.

The voltage follower may include a capacitor electrically coupled between the auxiliary voltage and the third node. Alternatively, the voltage follower may include a capacitor coupled in parallel between the auxiliary voltage and a second end of the third resistor.

The PSR power supply device according to the exemplary embodiments of the invention can be normally operated even though a range of an output voltage is wide.

DETAILED DESCRIPTION OF THE EMBODIMENTS

Figure 1:
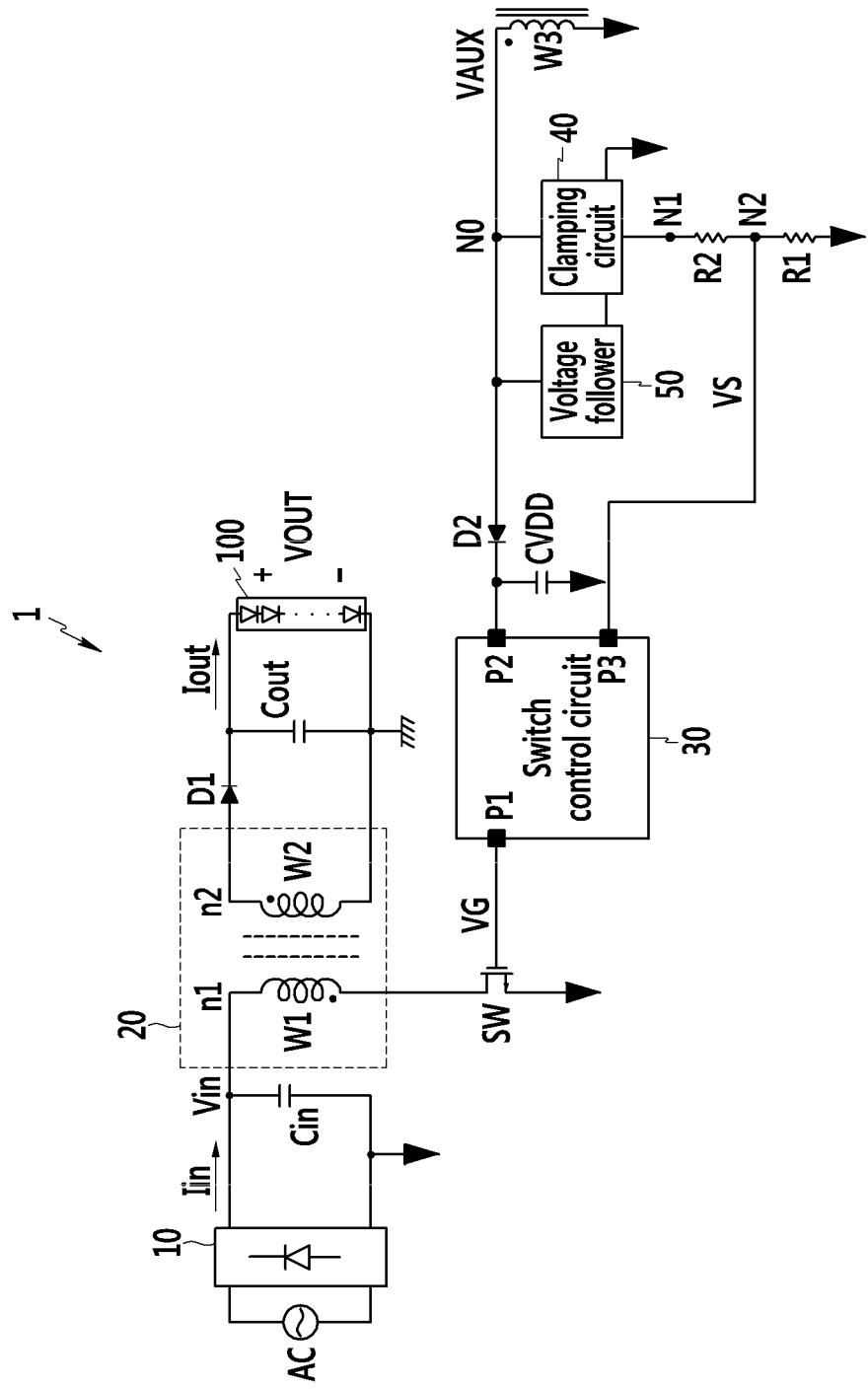
FIG. 1 shows a PSR power supply device according to an exemplary embodiment of the invention.

In the following detailed description, only certain exemplary embodiments of the invention have been shown and described, simply by way of illustration. As those skilled in the art would realize, the described embodiments may be modified in various different ways, all without departing from the spirit or scope of the invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising" will be understood to imply the inclusion of stated elements but not the exclusion of any other elements.

FIG. 1 shows a PSR power supply device according to an exemplary embodiment of the invention.

As shown in FIG. 1, a PSR power supply device 1 includes a rectification circuit 10, a capacitor Cin, a transformer 20, a rectification diode D1, an output capacitor Cout, a power switch SW, a switch control circuit 30, a clamping circuit 40, a voltage follower 50, and an auxiliary wiring W3.

The PSR power supply device 1 of FIG. 1 is implemented as a flyback converter, but the exemplary embodiment of the invention is not limited thereto.

Lateral ends of the PSR power supply device 1 are connected to a load 100, and a plurality of LEDs connected in series may be provided as an example of the load 100.

An AC input AC is rectified through the rectification circuit 10, and the rectified AC input AC is filtered through the capacitor Cin.

The rectification circuit 10 may be a full-bridge diode, which is a full-wave rectification circuit.

The transformer 20 includes a primary wiring W1 connected to an input voltage Vin and a secondary wiring W2 connected to an output voltage VOUT. The primary wiring W1 and the secondary wiring W2 are coupled in an insulated manner with a predetermined turn ratio, n1:n2 (n1 is turns of W1 and n2 is turns of W2).

A first end of the primary wiring W1 is connected to the input voltage Vin, and a second end of the primary wiring W1 is connected to a first electrode (i.e., a drain) of the power switch SW. Energy from an input current Iin is stored in the primary wiring W1 for a turn-on period of the power switch SW.

A first end of the secondary wiring W2 is connected to an anode of the rectification diode D1, and a second end of the secondary wiring W2 is connected to a secondary-side ground. For a turn-off period of the power switch SW, the energy stored in the primary wiring W1 is transmitted to the secondary wiring W2.

The power switch SW is electrically connected to the input voltage Vin, and controls output power of the power supply device 1. A gate of the power switch SW is connected to a gate voltage VG supplied from the switch control circuit 30, and a second electrode (i.e., a source) of the power switch SW is connected to a primary-side ground. The power switch SW is turned on by a high-level gate voltage VG and turned off by a low-level gate voltage VG.

The output capacitor Cout is connected between lateral output ends of the power supply device 1. A first electrode of the output capacitor Cout is connected to a cathode of the rectification diode D1, and a second electrode of the output capacitor Cout is connected to the secondary-side ground.

A current flowing to the secondary wiring W2 passes through the rectification diode D1. The current passed through the rectification diode D1 charges the output capacitor Cout or is supplied to a load 100. The load 100 is illustrated as a plurality of LED elements connected in series, but the power supply device 1 according to the present exemplary embodiment may be applied to another type of load. A current supplied to the load 100 is referred to as an output current Iout and a voltage supplied to the load 100 is referred to as an output voltage VOUT. The output voltage VOUT is smoothened by the output capacitor Cout.

The auxiliary wiring W3 provided in the primary side of the power supply device 1 shown in FIG. 1 is electromagnetically coupled with the primary wiring W1 with a predetermined turn ratio (n1:n3, turns of W1:turns of W3) and coupled in an insulated manner with the secondary wiring W2 with a predetermined turn ratio (n2:n3, turns of W2:turns of W3).

During the turn-on period of the power switch SW, a voltage between lateral ends of the primary wiring W1 is the input voltage Vin. Since a polarity of the voltage (hereinafter referred to as an auxiliary voltage, VAUX) between lateral ends of the auxiliary wiring W3 is opposite to the voltage between lateral ends of the primary wiring W1, the auxiliary voltage VAUX of the auxiliary wiring W3 is $-n13*Vin$ ($n13=n3/n1$) during the turn-on period.

During a turn-off period of the power switch M, the voltage between lateral ends of the primary wiring W1 is a negative voltage, which is proportional to the output voltage VOUT, and the auxiliary voltage VAUX is a positive voltage $n23*VOUT$ ($n23=n3/n2$), which is proportional to the output voltage VOUT during the turn-off period.

The switch control circuit 30 generates a gate voltage VG for controlling a switching operation of the power switch SW. The switch control circuit 30 controls the switching operation of the power switch SM based on information on the output voltage VOUT and the output current Iout. The information on the output voltage VOUT may be sensed using the sense voltage VS. During the turn-off period of the power switch SW, the auxiliary voltage VAUX equals a value acquired by multiplying a turn ratio (turns of W3/turns of W2) to the output voltage VOUT, and therefore the sense voltage VS generated by being resistively-divided from the auxiliary voltage VAUX depends on the output voltage VOUT.

The switch control circuit 30 senses a period (hereinafter referred to as a discharging period) during which a current flows to the secondary wiring W2 through the rectification diode D1 by using the sense voltage VS, the peak of a current flowing to the power switch SW in the primary side, and a switching cycle of the power switch SW, and may estimate the output current Iout using the sensed discharging period, the peak current, and the switching cycle. The discharging period may correspond to a period from a turn-off instant of the power switch SW to an instant at which the sense voltage VS starts to decrease due to a resonance. In addition, the switch control circuit 30 may generate information on the output current Iout by multiplying the peak current by the discharging period and dividing the product by the switching cycle.

A method to generate information on the output current Iout and the output voltage VOUT is not restrictive, and various methods are applicable.

The switch control circuit 30 includes a pin P1 through which the gate voltage VG is output, a pin P2 to which a power voltage VDD is supplied, and a pin P3 to which the sense voltage VS is input.

The diode D2 includes an anode connected to a first end of the auxiliary wiring W3 and a cathode connected to a capacitor CVDD, and the capacitor CVDD and the cathode of the diode D2 are connected to the pin P2. A current generated in the auxiliary wiring W3 is supplied to the capacitor CVDD through the diode D2 such that the capacitor CVDD is charged, and the power voltage VDD is a voltage of the capacitor CVDD. The power voltage VDD is a voltage required for operation of the switch control circuit 30.

A resistor R1 and a resistor R2 are connected in series between the node N1 and the primary-side ground, and a voltage of a node N2 to which the resistor R1 and the resistor R2 are connected is the sense voltage VS.

The clamping circuit 40 clamps the sense voltage VS to a predetermined voltage. Then, an increase of the sense voltage VS due to an increase of the output voltage VOUT can be limited to a predetermined voltage. The clamping circuit 40 is connected between a node N0 where the auxiliary voltage VAUX is generated and the node N1. The clamping circuit 40 limits the auxiliary voltage VAUX to a predetermined clamping voltage and supplies the clamping voltage to the node N1. Since the clamping voltage supplied to the node N1 is divided by the resistors R1 and R2 such that the sense voltage VS is determined, the sense voltage VS is clamped to a predetermined voltage.

The voltage follower 50 decreases the sense voltage VS according to a decrease of the auxiliary voltage VAUX. The voltage follower 50 is connected between the node N0 and the node N1. The voltage follower 50 decreases a voltage of the node N1 according to the decrease of the auxiliary voltage VAUX, and accordingly the sense voltage VS is also decreased according to the voltage decrease of the node N1.

In order to detect an accurate discharging period, the switch control circuit 30 needs to sense an accurate decrease start instant of the sense voltage VS after the turn-off instant of the power switch SW. The voltage follower 50 controls the sense voltage VS to be reduced according to the auxiliary voltage VAUX without any delay.

The voltage follower 50 may be connected with the node N1 through a partial structure of the clamping circuit 40. This will be described later with reference to FIG. 3.

Figure 2:
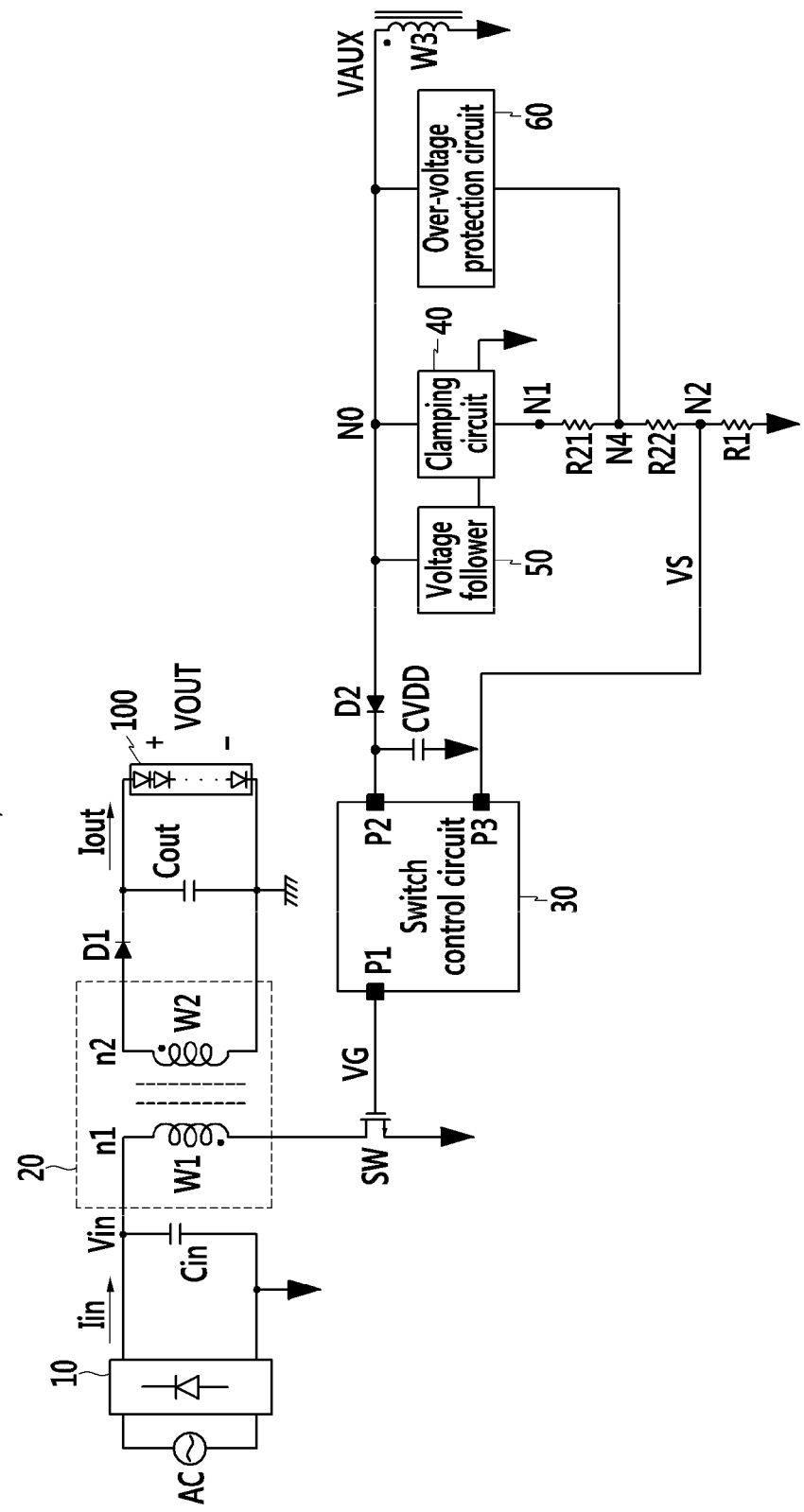
FIG. 2 shows a PSR power supply device according to another exemplary embodiment of the invention.

FIG. 2 shows a PSR power supply device according to another exemplary embodiment of the invention.

Unlike the PSR power supply device shown in FIG. 1, a PSR power supply device 2 according to the current exemplary embodiment of the invention further includes an over-voltage sensing circuit 60. The PSR power supply device 2 according to the current exemplary embodiment of the invention may sense an over-voltage of an output voltage VOUT using a sense voltage VS.

Compared to the power supply device 1 of FIG. 1, a resistor R2 is divided into two resistors R21 and R22, and the over-voltage sensing circuit 60 is connected between a node N4 to which the two resistors R21 and R22 are connected and a node N0 in the power supply device 2.

When the auxiliary voltage VAUX reaches a predetermined threshold voltage, the over-voltage sensing circuit 60 supplies an auxiliary voltage VAUX to the node N4 to increase the sense voltage VS according to the increase of the auxiliary voltage VAUX. In a normal state, the over-voltage sensing circuit 60 does not supply the auxiliary voltage VAUX to the node N4, and therefore a voltage of the node N4 is controlled by a clamping circuit 40 and a voltage follower 50.

That is, the clamping circuit 40 limits the auxiliary voltage VAUX to a predetermined clamping voltage and supplies the clamping voltage to the node N1. The clamping voltage supplied to the node N1 is divided by the resistors R1, R21, and R22 and thus the sense voltage VS is determined, and therefore the sense voltage VS is clamped to a predetermined voltage. The voltage follower 50 decreases the voltage of the node N1 according to a decrease of the auxiliary voltage VAUX, and the sense voltage VS is also decreased according to the voltage decrease of the node N1.

However, when the output voltage VOUT is in an over-voltage state, the auxiliary voltage VAUX is supplied to the node N4 such that the sense voltage VS is rapidly increased. The switch control circuit 30 senses the rapid increase of the sense voltage VS and activates an over-voltage protection operation.

Hereinafter, the exemplary embodiment shown in FIG. 1 will be described in detail with reference to FIG. 3 to FIG. 5.

Figure 3:
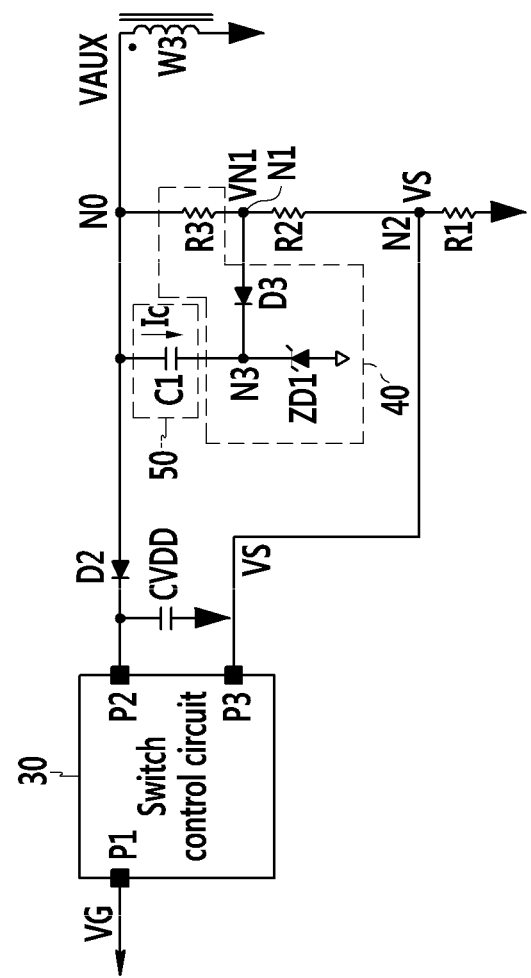
FIG. 3 shows an example of a clamping circuit and a voltage follower of FIG. 1.

FIG. 3 shows an example of the clamping circuit and the voltage follower of FIG. 1.

Figure 4:
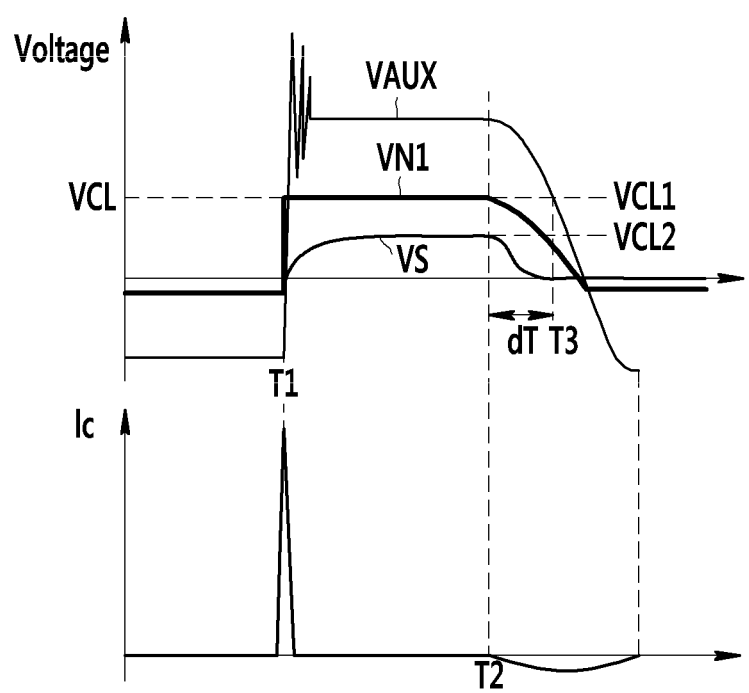
FIG. 4 is a waveform diagram of an auxiliary voltage, a voltage of a node N1, a sense voltage, and a current flowing to a voltage follower.

FIG. 4 is a waveform diagram of the auxiliary voltage, the voltage of the node N1, the sense voltage, and the current flowing to the voltage follower.

The clamping circuit 50 includes a resistor R3, a diode D3, and a Zener diode ZD1. The resistor R3 is connected between the node N0 and the node N1, the diode D3 is connected between the node N1 and the node N3, and the Zener diode ZD1 is connected between the node N3 and the primary-side ground.

An anode of the diode D3 is connected to the node N1 and a cathode thereof is connected to the node N3. A cathode of the Zener diode ZD1 is connected to the node N3 and an anode thereof is connected to the primary-side ground.

When the voltage of the node N1 is increased to be higher than a Zener voltage of the Zener diode ZD1 according to the increase of the auxiliary voltage VAUX, the diode D3 is turned on, and thus the voltage of the node N3 is maintained with the Zener voltage and the voltage of the node N1 is maintained with a voltage that is higher by a forward voltage of the diode D3 than the Zener voltage. Since the Zener voltage and the forward voltage of the diode D3 are constant voltages, the voltage of the node N1 is clamped to a predetermined voltage. The forward voltage is much lower than the Zener voltage, so the voltage of the node N1 is substantially clamped to the Zener voltage.

Since the voltage of the node N1 is clamped to the predetermined voltage, the sense voltage VS is also constantly clamped.

The voltage follower 50 includes a capacitor C1 connected between the node N0 and the node N3, and the capacitor C1 is connected with the node N1 when the diode D3 is turned on. When the auxiliary voltage VAUX starts to decrease, a current Ic that discharges the capacitor C1 is generated from the node N1 through the diode D3 and the capacitor C1. Then, the voltage of the node N1 is decreased according to the decrease of the auxiliary voltage VAUX and the sense voltage VS also starts to decrease.

Referring to FIG. 4, the auxiliary voltage VAUX is rapidly increased at T1, which is a turn-off instant of the power switch SW. Then, the diode D3 and the Zener diode ZD1 of the clamping circuit 40 are turned on and thus the voltage (hereinafter referred to as VN1) of the node N1 is clamped to a voltage VCL1. The sense voltage VS increases from T1 and is clamped to a level of a voltage VCL2.

At T1, a current Ic charging the capacitor C1 is generated from the node N0 by the auxiliary voltage VAUX. At T2, which is an instant that a secondary-side current becomes zero and thus a resonance is started, the current Ic discharging the capacitor C1 is generated. Then, from T2, the voltage VN1 is decreased and accordingly the sense voltage VS starts to decrease.

When the voltage follower 50 is not provided, the voltage VN1 is maintained at a constant level until before the auxiliary voltage VAUX is decreased to the voltage level VCL1 even though the auxiliary voltage VAUX starts to decrease. Then, the sense voltage VS may be maintained at a constant level rather than being decreased. That is, the sense voltage VS starts to decrease from T3 without the voltage follower 50 and accordingly a discharging period of the secondary-side current cannot be precisely measured.

The output voltage VOUT starts to decrease by the resonance from a termination instant of the discharging period and thus the auxiliary voltage VAUX is also decreased. However, a delay (dT in FIG. 4) occurs between the decrease instant of the auxiliary voltage VAUX and the decrease instant of the sense voltage VS so that a precise discharging period cannot be measured. In order to solve such a problem, the voltage follower 50 is included in the exemplary embodiment of FIG. 1.

Figure 5:
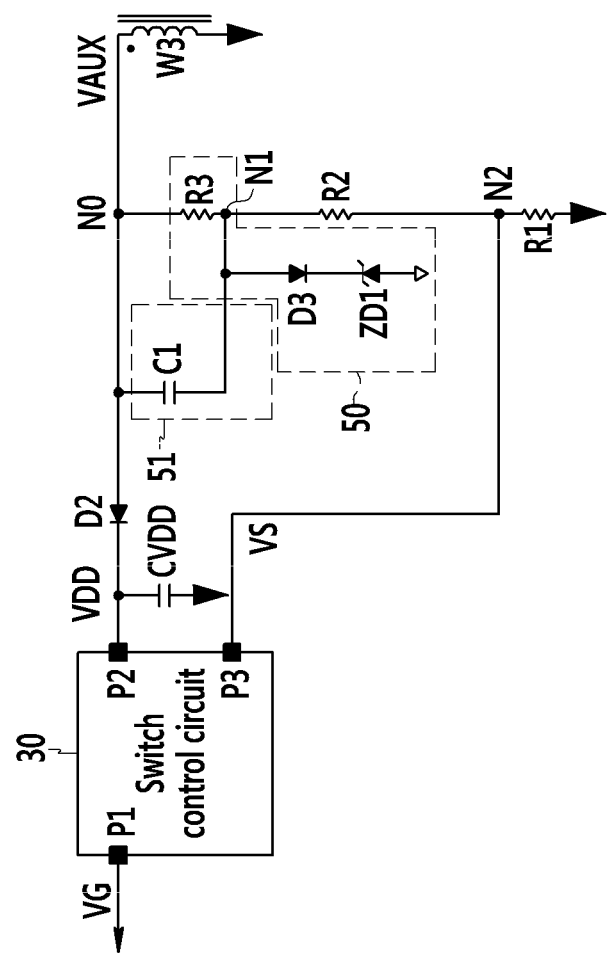
FIG. 5 is an exemplary variation of the voltage follower according to the exemplary embodiment of the invention.

FIG. 5 is an exemplary variation of the voltage follower according to the exemplary embodiment of the invention.

A connection relationship of a voltage follower 51 to a node N1 shown in FIG. 5 is different from the connection relationship of the voltage follower 50 to the node N1 shown in FIG. 1. The capacitor C1 includes a first electrode connected to the node N1 and a second electrode connected to the auxiliary voltage VAUX. Then, the capacitor C1 and the resistor R3 are connected in parallel.

When the auxiliary voltage VAUX starts to decrease, a discharge current that flows through the capacitor C1 is generated from the node N1. Then, a voltage of the node N1 is decreased according to the decrease of the auxiliary voltage VAUX, and thus the sense voltage VS also starts to decrease.

Figure 6:
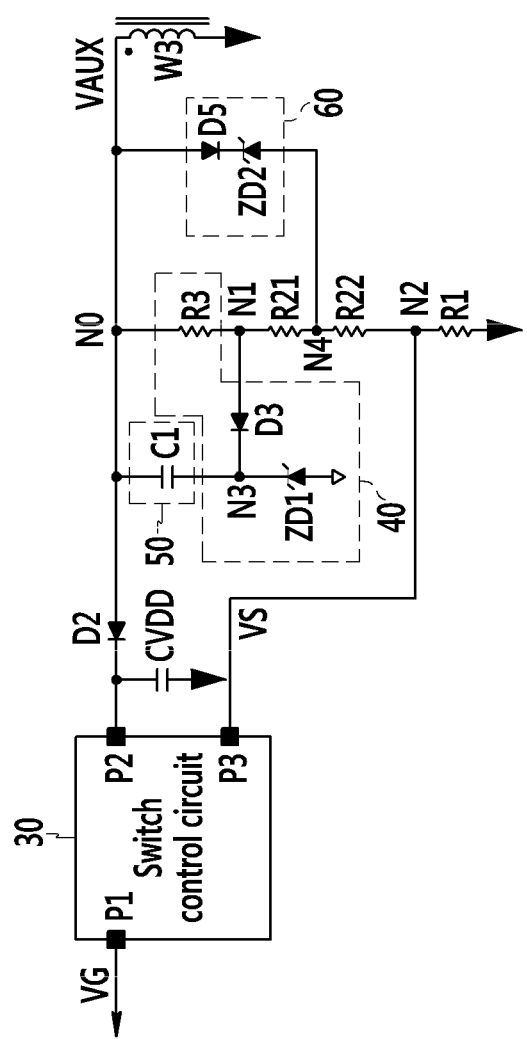
FIG. 6 shows an example of a clamping circuit, a voltage follower, and an over-voltage sensing circuit of FIG. 2.

FIG. 6 shows examples of the clamping circuit, the voltage follower, and the over-voltage sensing circuit of FIG. 2.

A clamping circuit 40 and a voltage follower 50 are the same as those in a previous exemplary embodiment of the invention, and therefore no detailed description will be provided. An over-voltage sensing circuit 60 includes a diode D5 and a Zener diode ZD2.

An anode of the diode D5 is connected to a node N0 and a cathode thereof is connected to a cathode of the Zener diode ZD2. An anode of the Zener diode ZD2 is connected to a node N4. Due to an increase of the auxiliary voltage VAUX, the diode D5 and the Zener diode ZD2 are turned on. Then, the node N4 is connected to the auxiliary voltage VAUX, and the sense voltage VS is generated with a voltage divided from the voltage of the node N4 by the two resistors R1 and R22. In this case, a voltage of the node N4 may be a voltage acquired by subtracting a forwarding voltage of the diode D5 and a Zener voltage of the Zener diode ZD2 from the auxiliary voltage VAUX.

As described, the PSR power supply device according to the exemplary embodiments of the invention can control the sense voltage within a predetermined voltage range even though a range of the output voltage is wide. In addition, when an over-voltage of the output voltage occurs, the PSR power supply device according to the other exemplary embodiment of the invention can sense the over-voltage through the sense voltage.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

1: PSR power supply device
10: rectification circuit
20: transformer
30: switch control circuit
40: clamping circuit
50: voltage follower
60: over-voltage sensing circuit

What is claimed is:

1. A primary-side regulation (PSR) power supply device comprising:
   a power switch;
   an auxiliary wiring from which an auxiliary voltage that depends on an output voltage is generated during a turn-off period of the power switch;
   a clamping circuit configured to clamp a sense voltage corresponding to the auxiliary voltage to a predetermined voltage when the auxiliary voltage exceeds a clamping voltage during the turn-off period of the power switch;
   a voltage follower configured to decrease the sense voltage from the predetermined voltage according to a decrease of the auxiliary voltage while the auxiliary voltage remains higher than the clamping voltage; and
   a switch control circuit configured to control a switching operation of the power switch by using the sense voltage.

2. The PSR power supply device of claim 1, further comprising a first resistor and a second resistor coupled in series,
   wherein a voltage of a first node where a first end of the first resistor and a first end of the second resistor are coupled is the sense voltage, and the clamping circuit is configured to limit the auxiliary voltage to the clamping voltage and supply the clamping voltage to a second end of the second resistor.

3. The PSR power supply device of claim 2, wherein the clamping circuit comprises:
   a third resistor including a first end coupled to the auxiliary voltage and a second end coupled to the second end of the second resistor;
   a first diode including an anode coupled to the second end of the third resistor; and
   a first Zener diode coupled to a cathode of the first diode, wherein the clamping voltage is a voltage corresponding to a Zener voltage of the first Zener diode.

4. The PSR power supply device of claim 3, wherein the voltage follower comprises a capacitor coupled between the auxiliary voltage and a second node to which the first Zener diode and the cathode of the first diode are coupled.

5. The PSR power supply device of claim 3, wherein a capacitor in the voltage follower is coupled in parallel with the third resistor.

6. The PSR power supply device of claim 1, further comprising a first resistor and a second resistor coupled in series,
   wherein a voltage of a first node where a first end of the first resistor and a first end of the second resistor are coupled is the sense voltage, and
   the voltage follower is configured to decrease a voltage of a second end of the second resistor according to a decrease of the auxiliary voltage.

7. The PSR power supply device of claim 6, wherein the voltage follower comprises a capacitor electrically coupled between the auxiliary voltage and the second end of the second resistor.

8. The PSR power supply device of claim 1, further comprising an over-voltage sensing circuit that increases the sense voltage according to an increase of the auxiliary voltage when the auxiliary voltage is higher than a predetermined threshold voltage.

9. The PSR power supply device of claim 8, further comprising first, second and third resistors coupled in series,
   wherein a voltage of a first node to which a first end of the first resistor and a first end of the second resistor are coupled is the sense voltage and a second end of the second resistor and a first end of the third resistor are coupled in a third node, and
   when the auxiliary voltage is higher than the threshold voltage,
   the over-voltage sensing circuit increases a voltage of the third node according to the increase of the auxiliary voltage.

10. The PSR power supply device of claim 9, wherein the over-voltage sensing circuit comprises:
    a second diode including an anode coupled to the auxiliary voltage; and
    a second Zener diode including a cathode coupled to a cathode of the second diode and an anode coupled to the third node.

11. The PSR power supply device of claim 9, wherein a voltage of a second end of the third resistor is limited to the clamping voltage by the clamping circuit.

12. The PSR power supply device of claim 9, wherein the clamping circuit comprises:
    a fourth resistor including a first end coupled to the auxiliary voltage and a second end coupled to the second end of the third resistor;
    a first diode including an anode coupled to the second end of the fourth resistor; and
    a first Zener diode coupled to a cathode of the first diode, wherein the clamping voltage is a voltage corresponding to a Zener voltage of the first Zener diode.

13. The PSR power supply device of claim 12, wherein the voltage follower comprises a capacitor electrically coupled between the auxiliary voltage and the cathode of the first diode.

14. The PSR power supply device of claim 12, wherein the voltage follower comprises a capacitor coupled to the first Zener diode.

15. The PSR power supply device of claim 9, wherein the voltage follower comprises a capacitor electrically coupled between the auxiliary voltage and the third node.

16. The PSR power supply device of claim 9, wherein the voltage follower comprises a capacitor coupled in parallel between the auxiliary voltage and a second end of the third resistor.

* * * * *